United States Patent [19]

Gattuso

[11] 3,963,683

[45] June 15, 1976

[54] RUBBER FORMULATIONS CONTAINING VULCANIZATION INHIBITING THIOFORMAMIDINE COMPOUNDS

[75] Inventor: Marion J. Gattuso, Hoffman Estates, Ill.

[73] Assignee: Universal Oil Products Company, Des Plaines, Ill.

[22] Filed: Dec. 17, 1974

[21] Appl. No.: 533,574

Related U.S. Application Data

[63] Continuation-in-part of Ser. No. 464,584, April 26, 1974, Pat. No. 3,879,459.

[52] U.S. Cl. ............... 260/79.5 A; 260/79.5 B; 260/564 R; 260/780; 260/795
[51] Int. Cl.² ................. C08C 11/54; C08D 9/00
[58] Field of Search ........... 260/79.5 B, 564 R, 780, 260/783, 795, 796, 798

[56] References Cited

UNITED STATES PATENTS 3,513,139   5/1970   Coran ............................ 260/79.5

Primary Examiner—Christopher A. Henderson, Jr.
Attorney, Agent, or Firm—James R. Hoatson, Jr.; Raymond H. Nelson; William H. Page, II

[57] ABSTRACT

Vulcanizable rubber formulations will contain compounds comprising substituted thioformamidines as exemplified by N,N'-diphenyl-N-cyclohexylthioformamidine to inhibit the premature vulcanization thereof.

10 Claims, No Drawings

RUBBER FORMULATIONS CONTAINING VULCANIZATION INHIBITING THIOFORMAMIDINE COMPOUNDS

CROSS-REFERENCE TO RELATED APPLICATIONS

This application is a continuation-in-part of my co-pending Application Ser. No. 464,584 filed Apr. 26, 1974, now Pat. No. 3,879,459, Apr. 22, 1975, all teachings of which are incorporated herein by reference thereto.

BACKGROUND OF THE INVENTION

Rubber formulations, either synthetic or naturally occurring, must be processed in order to prepare finished products which are usable in industry. Among these processing features is the vulcanization of the rubber mixture by means well known in the art. In this respect various changes in the processing of rubber formulations have been adopted to facilitate the aforesaid processing, thereby improving the properties of the rubber products. Some of these changes, however, have resulted in a certain amount of premature vulcanization which is known in the trade as scorching and occurs prior to the desired vulcanization. Compounds may also be present in the rubber formulation which will adversely effect the induction time or scorch duration period prior to vulcanization. For example, the rubber formulation may contain an antiozonant therein in order to impart protection to the finished rubber product against ozone cracking. Among the more popular antiozonants which are utilized for this purpose are the phenylenediamine type of compounds. However, this type of antiozonant appears to promote scorching or premature vulcanization. Another compound which may be present and which may have an adverse effect on the vulcanization period is a high pH furnace black which appears to lack the inherent inhibiting effect of the acidic channel blacks. In the past, it has been a common practice to utilize certain compounds to reduce the risk of scorching prior to vulcanization. However, such compounds as the N-nitrosoamine type of retarders often are of limited effectiveness or adversely effect the vulcanization process and the quality of the final products.

In contrast to this, it has now been found that novel compounds comprising substituted thioformamidines may be utilized as premature vulcanization inhibitors in rubber formulations to obtain products which do not obtain the unwanted characteristics of rubber formulations containing other vulcanization inhibitors which have been used in the past.

This invention relates to rubber formulations containing substituted thioformamidines, and more particularly to the use of these substituted thioformamidines as scorch inhibitors in the accelerated sulfur vulcanization of various rubber formulations.

It is therefore an object of this invention to provide rubber formulations containing, as an inhibitor thereof, a substituted thioformamidine of the type hereinafter set forth in greater detail.

In one aspect an embodiment of this invention resides in a vulcanizable rubber formulation containing, as an inhibitor against the premature vulcanization thereof, a compound comprising a substituted thioformamidine having the formula:

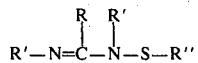

in which the R's are independently selected from the group consisting of hydrogen, alkyl, cycloalkyl, aryl and aralkyl radicals.

A specific embodiment of this invention is found in a vulcanizable rubber formulation containing, as an inhibitor against premature vulcanization thereof, a substituted thioformamidine comprising N,N'-diphenyl-N-cyclohexylthioformamidine.

Other objects and embodiments will be found in the following further detailed description of the present invention.

As hereinbefore set forth, the present invention is concerned with vulcanizable rubber formulations containing novel compounds which are used to inhibit the scorch in the accelerated sulfur vulcanization of rubber, the compounds comprising substituted thioformamidines. For purposes of the present invention, the term "formamidines" as used in the present specification and appended claims will refer to compounds having a basic formamidine structure and to higher homologs thereof including substituted acetamidines, propioamidines, butyramidines, valerylamidines, etc. The compounds of the present invention may be prepared in a two-step process, the first step being the reaction between a primary amine and a carboxylic acid. Examples of primary amines which may be used will include alkyl amines in which the alkyl substituent contains from 1 to about 10 carbon atoms such as methylamine, ethylamine, propylamine, isopropylamine, butylamine, amylamine, hexylamine, heptylamine, octylamine, nonylamine, decylamine, etc., the aforesaid amines including straight chain and branched chain isomers thereof; aryl amines such as phenylamine, naphthylamine, etc.; aralkyl amines such as o-tolylamine, benzylamine, phenylethylamine, etc.; cycloalkyl amines in which the ring will contain from 3 to about 8 carbon atoms such as cyclopropylamine, cyclobutylamine, cyclopentylamine, cyclohexylamine, cycloheptylamine, cyclooctylamine, etc. The aforementioned amines are reacted with a carboxylic acid of the fatty acid type, said acids including formic acid, acetic acid, propionic acid, butyric acid, valeric acid, caproic acid, heptanoic acid, caprylic acid, pelargonic acid, capric acid, etc. The reaction between the acid and the primary amine is effected at elevated temperatures ranging from about 100° up to about 200° C. or more, the primary amine being present in the reaction mixture in a molar excess over that of the carboxylic acid, said molar excess being in a range of from about 2:1 to about 3:1 moles of primary amine per mole of carboxylic acid.

The resulting substituted formamidines which are prepared, for example, according to the above paragraph are then further reacted with a sulfenyl chloride, said reaction being preferably effected at depressed temperatures ranging from about 0° up to about 20° C. and preferably in a range of from about 0° up to about 10° C. in the presence of an acid scavenger and an organic solvent of the type hereinafter set forth in greater detail. Examples of substituted sulfenyl halides and preferably substituted chlorides which may be employed as one of the starting materials for reaction with the substituted formamidine will include those compounds having the generic formula:

R - S - X in which R is selected from the group consisting of alkyl of from 1 to about 10 carbon atoms, cycloalkyl of from 3 to about 8 carbon atoms, aryl and aralkyl radicals and X is a halogen atom, preferably chlorine. Some representative examples of these sulfenyl halide compounds will include methanesulfenyl chloride, ethanesulfenyl chloride, propanesulfenyl chloride, butanesulfenyl chloride, pentanesulfenyl chloride, hexanesulfenyl chloride, heptanesulfenyl chloride, octanesulfenyl chloride, nonanesulfenyl chloride, decanesulfenyl chloride, cyclopropanesulfenyl chloride, cyclobutanesulfenyl chloride, cyclopentanesulfenyl chloride, cyclohexanesulfenyl chloride, cycloheptanesulfenyl chloride, benzenesulfenyl chloride, naphthalenesulfenyl chloride, o-toluenesulfenyl chloride, m-toluenesulfenyl chloride, p-toluenesulfenyl chloride, o-ethylbenzenesulfenyl chloride, m-ethylbenzenesulfenyl chloride, p-ethylbenzenesulfenyl chloride, 1-methylnaphthalenesulfenyl chloride, 2-methylnaphthalenesulfenyl chloride, etc. It is also contemplated within the scope of this invention that the corresponding bromide and iodide compounds may be used, although not necessarily with equivalent results.

The reaction between the substituted formamidine and the sulfenyl halide of the types hereinbefore set forth is effected in the presence of an acid scavenger which is basic in nature and will preferably include such compounds as tertiary amines, some representative examples of these tertiary amines which may be employed being trimethylamine, triethylamine, tri-n-propylamine, tri-n-butylamine, tri-t-butylamine, triphenylamine, etc. In addition, the reaction is also effected in the presence of an inert organic solvent, said solvents including dimethylformamide, diethylformamide, dipropylformamide or aromatic solvents such as benzene, toluene, xylene, etc.

The preparation of the compounds which may be used in the present invention to inhibit the premature vulcanization of a vulcanizable rubber formulation may be effected in any suitable manner and may comprise either a batch or continuous operation. For example, when a batch type operation is used, a quantity of the primary amine and the carboxylic acid in a mole ratio of at least 2 moles of amine per mole of acid is placed in an appropriate apparatus such as, for example, a flask provided with appropriate water removal means such as a Dean-Stark water trap, etc. The mixture is then heated to the desired operating temperature which may be in a range of from about 100° to about 200° C. or more and maintained thereat for a predetermined residence time which may range from about 1 up to about 20 hours or more in duration. During this time, the water which is formed will be continuously removed. At the end of the desired reaction time, the reaction mixture is recovered and the substituted formamidines are recovered by conventional means from said mixture, said means including washing, drying, fractional distillation, etc. The thus formed substituted formamidines are then placed in a second reaction vessel along with the sulfenyl halide, acid scavenger and solvent, said reaction being effected by slowly adding the sulfenyl halide to the reaction mixture while maintaining the temperature of the reaction in a range of from about 0° to about 10° C. utilizing any cooling means known in the art such as, for example, an ice bath. Upon completion of the addition of the substituted sulfenyl halide, the solution is allowed to warm to room temperature while vigorously stirring the reaction mixture. After reaching room temperature, the solution is thereafter treated in a conventional manner similar to that hereinbefore set forth, that is, by washing, drying, separation, crystallization, recrystallization, etc., whereby the desired product comprising substituted thioformamidines are separated and recovered.

It is also contemplated within the scope of this invention that the compounds may be obtained utilizing a continuous manner of operation. When this type of operation is used, the starting materials comprising the primary amine and the carboxylic acid are continuously charged to a reaction zone which is maintained at the proper operating conditions of temperature and pressure. If so desired, the starting materials are charged to said reactor through separate lines or they may be admixed prior to entry into said reactor zone and charged thereto in a single stream. Upon completion of the desired residence time, the reactor effluent is continuously withdrawn and subjected to conventional separation means such as fractional distillation whereby the desired product comprising a substituted formamidine is separated from the unreacted primary amine and carboxylic acid, the latter two being recycled to form a portion of the feed stock while the former is continuously charged to a second reactor containing the acid scavenger and the solvent. The second reactor is maintained at depressed temperature in the range hereinbefore set forth while the substituted sulfenyl halide is also continuously charged thereto. As in the case of the first reaction, it is also contemplated within the scope of this invention that the starting materials, the solvent and the acid scavenger may be charged to the second reactor through separate lines or, if so desired, one or more of the components of the reaction mixture may be admixed prior to entry into said reaction zone and the resulting mixture charged thereto in a single stream. As in the case of the first reactor, the reactor effluent is also continuously removed from the second reactor and separated by conventional means whereby the desired substituted thioformamidines may be recovered while any unreacted starting materials as well as the solvent and acid scavenger are recycled to the second reactor to form a portion of the feed stock therefor.

The compounds which have been prepared in the manner hereinbefore set forth and which may be utilized, as hereinbefore set forth, to inhibit the premature vulcanization of rubber formulations will possess the generic formula:

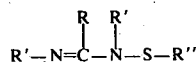

in which the R's are independently selected from the group consisting of hydrogen, alkyl of from 1 to about 10 carbon atoms, cycloalkyl of from 3 to about 8 carbon atoms, aryl, aralkyl and heterocyclic radicals. Some specific examples of these compounds will include N,N'-dimethyl-N-cyclohexylthioformamidine, N,N'-diethyl-N-cyclohexylthioformamidine, N,N'-dipropyl-N-cyclohexylthioformamidine. N,N'-dihexyl-N-cyclohexylthioformamidine, N,N'-dinonyl-N- cyclohexylthioformamidine, N,N'-didecyl N,N'-diphenyl-N-cyclohexylthioformamidine, N,N'-di-p-tolyl-N-cyclohexylthioformamidine, N,N'-dimethyl-N-decylthioformamidine, N,N'-diethyl-N-decylthioformamidine, N,N'-dipropyl-N-decylthioformamidine, N,N'-dihexyl-N-decylthioformamidine, N,N'-dinonyl-N-decylthioformamidine, N,N'-didecyl-N-decylthioformamidine, N,N'-dimethyl-N:cyclohexylthioacetamidine, N,N'-dipropyl-N-cyclohexylthioacetamidine, N,N'-dihexyl-N-cyclohexylthioactamidine, N,N'-dinonyl-N-cyclohexylthioacetamidine, N,N'-didecyl-N-cyclohexylthioacetamidine, N,N'-diphenyl-N-cyclohexylthioacetamidine, N,N'-di-p-tolyl-N-cyclohexylthioacetamidine, N,N'-dimethyl-N-decylthioacetamidine, N,N'-diethyl-N-decylthioacetamidine, N,N'-dipropyl-N-decylthioacetamidine, N,N'-dihexyl-N-decylthioacetamidine, N,N'-dinonyl-N-decylthioacetamidine, N,N'-didecyl-N-decylthioacetamidine, N,N'-dimethyl-N-cyclohexylthiobutyramidine, N,N'-diethyl-N-cyclohexylthiobutyramidine, N,N'-dipropyl-N-cyclohexylthiobutyramidine, N,N'-dihexyl-N-cyclohexylthiobutyramidine, N,N'-dinonyl-N-cyclohexylthiobutyramidine, N,N'-didecyl-N-cyclohexylthiobutyramidine, N,N'-diphenyl-N-cyclohexylthiobutyramidine, N,N'-di-p-tolyl-N-cyclohexylthiobutyramidine, N,N'-dimethyl-N-decylthiobutyramidine, N,N'-diethyl-N-decylthiobutyramidine, N,N'-dipropyl-N-decylthiobutyramidine, N,N'-dihexyl-N-decylthiobutyramidine, N,N'-dinonyl-N-decylthiobutyramidine, N,N'-didecyl-N-decylthiobutyramidine, etc. It is to be understood that the aforementioned compounds as well as the aforementioned starting materials including the primary amines, carboxylic acids and substituted sulfenyl halides are only representative of the class of compounds which may be prepared and which may be used, and that the present invention is not necessarily limited thereto.

The aforementioned compounds comprising substituted thioformamidines are used as inhibitors in rubber formulations in any suitable concentration, said concentration varying with the particular rubber formulation. In the preferred embodiment of the invention the concentration may be within a range of from about 0.1 to about 5 and more specifically in a range of from about 0.1 to about 2 phr (parts per hundred parts by weight of rubber hydrocarbon).

As was previously set forth, these compounds are used in any vulcanizable rubber formulation, either synthetic or naturally occurring, in order to inhibit premature vulcanization. Some illustrative examples of the rubber formulations would include methyl rubber, Buna S, SBR (styrene-butadiene), polymers of butadiene or copolymers thereof with other monomers such as, for example, acrylonitrile, isobutylene, methyl methacrylate, cis-4-polybutadiene, butyl rubber, ethylene propylene terpolymers, etc.

As was previously discussed, in order to protect the finished rubber product against cracking due to ozone, an antiozonant generally is incorporated in the rubber formulation. Any suitable antiozonant may be used and, in one embodiment, is of the phenylenediamine type. This type of compound will include, for example, N,N'-di-sec-alkyl-p-phenylenediamines, in which each alkyl substituent contains from 3 to 12 carbon atoms, and N-phenyl-N'-sec-alkyl-p-phenylenediamines, in which the alkyl substituent contains from 3 to 12 carbon atoms, N,N'-dicyclohexyl-p-phenylenediamines, N-phenyl-N'-cyclohexyl-p-phenylenediamine, etc. In another embodiment, the rubber formulation may include antiozonants which are of the aminophenyl types and include alkyl-substituted aminophenols in which the alkyl substituent on the nitrogen atom will contain from 3 to 20 carbon atoms or cycloalkyl-substituted p-aminophenyls in which the cycloalkyl substituent on the nitrogen atom will contain from 3 to 12 carbon atoms in the ring. In most rubber formulations the antiozonant may be present in a concentration of from about 1 to about 5 parts by weight per hundred parts of rubber hydrocarbon in the formulation.

In addition to the antiozonant, the rubber formulation will generally include a vulcanization accelerator. Any suitable vulcanizing accelerator may be used including the conventional types such as 2-mercaptobenzothiazole, N-cyclohexyl-2-benzothiazole sulfenamide, N-tert-butyl-2-benzothiazole sulfenamide, 2-(morpholinothio)-benzothiazole, N-phenyl-2-benzothiazole sulfenamide, 2-benzothiazolyl diethyldithiocarbamate, amine salts of mercaptobenzothiazole accelerators, etc. Other accelerators include tetramethylthiuram disulfide, thiocarbamyl sulfenamides, thioureas, xanthates, guanidine derivatives, etc. The vulcanizing accelerator will be used in conventional concentrations in the rubber formulation and may be within the range of from about 0.4 to about 3.0 parts by weight per hundred parts of rubber hydrocarbon in the formulation. It is understood that smaller or larger concentrations may be used when desired.

As hereinbefore set forth the compounds of the present invention are also present in the rubber formulation in order to retard or inhibit the scorch in the accelerated sulfur vulcanization of the rubber formulation when said vulcanization is carried out at the usual temperature which may range from about 120° to about 170° C. or more. By utilizing these compounds, as will hereinafter be shown in greater detail in the appended examples, it is possible to retard the scorch which is present in the accelerated sulfur vulcanization of rubber thus preventing any premature vulcanization which is undesirable and which may lead to the preparation of finished rubber products which do not possess desirable characteristics.

The following examples are given to illustrate the preparation of the premature vulcanization compounds and also to their use as prevulcanization inhibitors. However, these examples are not intended to limit the generally broad scope of the present invention in strict accordance therewith.

EXAMPLE I

In this example 94.2 grams (2.04 moles) of anhydrous formic acid and 404 grams (4.34 moles) of aniline in 200 cc. of xylene were heated in a 1 liter flask equipped with a Dean-Stark trap. The reaction was effected at a temperature of 150° C. for a period of 3 hours, 50 cc. of water being removed from the system during this period. The temperature of the reactor was increased and the xylene solvent was recovered in an overhead trap. The reaction was allowed to proceed for a total period of 10 hours, after which the reaction mixture was allowed to cool to room temperature. The resulting solid mass which was dark brown in color was taken up in 1 liter of methyl alcohol and thereafter was recrystallized twice with benzene. The buff colored crystalline needles were subjected to a melting point determination and found to have a melting point of 137°–139° C. This melting point corresponded to the literature value for N,N'-diphenylformamidine of 137°–138° C.

Thereafter 97.5 grams (0.5 mole) of the N,N'-diphenylformamidine which is prepared according to the above paragraph is placed in a flask which is cooled to a temperature of about 0° C. by means of an ice bath. Following this 75 grams (0.5 mole) of cyclohexanesulfenyl chloride is slowly added dropwise to the flask containing the aforementioned N,N'-diphenylformamidine along with 100 grams (1 mole) of triethylamine and 200 cc. of benzene. Upon completion of the addition of the cyclohexanesulfenyl chloride, the mixture is stirred for an additional period of 30 minutes after reaching room temperature and thereafter is filtered. The precipitate is washed with benzene, air dried, and the benzene solvent is removed by vacuum. The desired product comprising, N,N'-diphenyl-N-cyclohexylthioformamidine is recovered.

EXAMPLE II

To a 1 liter flask equipped with a Dean-Stark water trap is charged 120 grams (2.0 mole) of acetic acid and 390 grams (4.2 mole) of aniline along with 200 cc. of toluene. The flask is then heated to reflux and allowed to proceed at said temperature for a period of 3 hours, the water of condensation which is formed being continuously removed from the system. At the end of the 3-hour period, the temperature of the reaction is raised and a major portion of the toluene is distilled off. After an additional period of 2 hours, the temperature is again raised until the remaining portion of the solvent has been removed and thereafter the reactor is allowed to return to room temperature. Upon reaching room temperature, the solid mass which formed is recovered, taken up in 1 liter of methyl alcohol and recrystallized after being treated two times with hot benzene. The material which comprises N,N'-diphenylacetamidine is then recovered.

The N,N'-diphenylacetamidine which is prepared according to the above paragraph is then placed in a flask along with an acid scavenger comprising triethylamine using dimethylformamide as a solvent. The mixture is cooled to a temperature of 0° C. and maintained thereat while an equimolar amount of cyclohexanesulfenyl chloride is slowly added thereto dropwise. The temperature of the reaction will range from about 0° to about 10° C. with continuous stirring. Following the completion of the addition of the cyclohexanesulfenyl chloride, the reaction mixture is stirred for an additional period of 1 hour while allowing the temperature of the solution to reach room temperature. Following this, water is added and the organic layer which separates out is thereafter washed several times with water, dried over magnesium sulfate and subjected to vacuum to remove the dimethylformamide solvent. The resulting material will slowly crystallize and the crystals comprising N,N'-diphenyl-N-cyclohexylthioacetamidine will be recovered by filtration.

EXAMPLE III

In like manner a mixture comprising 120 grams (2.0 moles) of anhydrous acetic acid and 314 grams (4.3 mole) of n-octylamine along with 200 cc. of xylene is placed in a 1 liter flask equipped with a Dean-Stark water trap. The flask is then heated to reflux and maintained thereat for a period of 3 hours, the water of condensation which is formed during the reaction being continuously removed from the system. At the end of the 3-hour period, the temperature of the flask is increased until the xylene solvent has been distilled off. Upon recovery of the solvent, the reaction mixture is then allowed to cool to room temperature and transferred to a separate flask. The N,N'-dioctylacetamidine which is prepared thusly is then placed in a flask along with triethylamine and a benzene solvent following which the flask is then cooled to a temperature of 0° C. Upon reaching this reduced temperature, the mixture is treated by slowly adding dropwise an equimolar amount of cyclohexanesulfenyl chloride, the temperature of the solution being maintained in a range of from 0° to 10° C. Upon completion of the addition of the cyclohexanesulfenyl chloride which is accompanied by continuous stirring, the mixture is allowed to return to room temperature while maintaining the stirring thereof. At the end of a 1-hour period, the solid which is formed is washed with benzene and air dried for a period of 24 hours. The solution is then washed with water, dried over magnesium sulfate and the benzene solvent is removed by vacuum. Upon further standing, the desired product comprising N,N'-dioctyl-N-cyclohexylthioacetamidine will crystallize out and may be then recrystallized from an isopropyl-ethyl acetate solution.

EXAMPLE IV

To a 1 liter flask equipped with a Dean-Stark trap is added 92 grams (2.0 mole) of anhydrous formic acid and 449 grams (4.2 mole) of p-toluidine along with 200 cc. of xylene. The flask is heated to reflux and maintained thereat for a period of 3 hours during which time the water of condensation which is formed during the reaction is continuously removed. At the end of this 3-hour period, the temperature of the reactor is increased and maintained at the increased temperature until the xylene solvent is removed. Following removal of the xylene solvent, the reaction mixture is allowed to cool to room temperature and the resulting mass is taken up in 1 liter of methyl alcohol and thereafter recrystallized from benzene.

The N,N'-di-p-tolylformamidine which is prepared according to the above paragraph is then placed in a flask which is cooled to a temperature of about 0° C. by means of an ice bath. In addition, there was also present in the flask 100 grams of triethylamine and 200 cc. of benzene. When the mixture has reached the desired reduced temperature, decanesulfenyl chloride is slowly added dropwise accompanied by continuous stirring. Upon completion of the addition of the decanesulfenyl chloride, the mixture is stirred for an additional period of 1 hour and then allowed to warm to room temperature. Upon standing the desired product comprising N,N'-di-p-tolyl-N-decylthioformamidine crystallizes, is filtered, washed and recovered.

EXAMPLE V

In like manner a reaction mixture comprising 88 grams (1.0 mole) of butyric acid and 235 grams (2.2 mole) of benzylamine along with 200 cc. of toluene is treated in a manner similar to that set forth in the above examples, that is, by refluxing for a period of 3 hours followed by an additional period of heating at increased temperature whereby all of the water and solvent are removed from the reaction mixture. The resulting N,N'-dibenzylbutyramidine is recovered and reacted in like manner with cyclohexanesulfenyl chloride at a temperature of about 0° C. in the presence of triethylamine and a benzene solvent. After treating the reaction mixture in a manner similar to that set forth in the above examples, the desired product comprising N,N'-dibenzyl-N-cyclohexylthiobutyramidine is recovered.

EXAMPLE VI

To illustrate the ability of the novel compounds of the present invention to act as scorch inhibitors in the accelerated vulcanization of rubber, the scorch properties of a rubber formulation are determined with a large rotor Mooney Viscometer at 250° F. (ASTM D-1077-55T). The values which are obtained will represent the number of minutes for a rubber containing a curing agent to increase in viscosity by 1 and then by 10 points. The method which is utilized simulates conditions encountered during milling and subsequent vulcanization, a long scorch time indicating a high resistance to scorching. A rubber formulation is prepared according to the following recipe.

| Ingredient | Parts by Weight |
|---|---|
| SBR 1502 | 100.00 |
| Furnace Black | 40.00 |
| Oil Extender | 10.00 |
| Zinc Oxide | 3.00 |
| Stearic Acid | 2.00 |
| Sulfur | 2.00 |
| Antiozonant | 2.00 |
| Inhibitor | 0.50–1.00 |

The above ingredients are incorporated by conventional -di-p-tolyl-N-decylthioformamidine, procedures and the formulations are then cured for 40 minutes at a temperature of 140° C. It will be determined from the above tests that the rubber formulations which contain the novel compounds of the present invention which act as scorch inhibitors will exhibit a percentage increase in the 1 point rise time as well as the 10 point rise time which will constitute a clear indication of the fact that the novel compounds of the present invention such as N,N'-diphenyl-N-cyclohexylthioformamidine, N,N'-diphenyl-N-cyclohexylthioacetamidine, N,N'-dibutyl-N-cyclohexylthioacetamidine, N,N'di-p-tolyl-N-decylthioformamidine, and N,N'-dibenzyl-N-cyclohexylthiobutyramidine which are incorporated in the aforementioned rubber formulation will possess the ability to inhibit the premature vulcanization of a rubber formulation.

In addition to their ability to inhibit the premature vulcanization of the rubber formulation set forth in the above paragraph, the compounds will also inhibit the premature vulcanization of other rubber compounds such as methyl rubber, Buna S rubber, butyl rubber, etc.

I claim as my invention:

1. A vulcanizable diene rubber composition containing, as an inhibitor against the premature vulcanization thereof, a substituted thioformamidine having the formula:

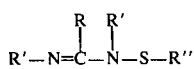

in which the R's are independently selected from the group consisting of hydrogen, alkyl, cycloalkyl, aryl and aralkyl radicals.

2. The composition of claim 1 containing N,N'-diphenyl-N-cyclohexyl-thioformamidine as said inhibitor.

3. The composition of claim 1 containing N,N'-diphenyl-N-cyclohexylthioacetamidine as said inhibitor.

4. The composition of claim 1 containing N,N'-dioctyl-N-cyclohexyl-thioacetamidine as said inhibitor.

5. The composition of claim 1 containing N,N'-di-p-tolyl-N-decylthio-formamidine as said inhibitor.

6. The composition of claim 1 containing N,N'-dibenzyl-N-cyclohexyl-thiobutyramidine as said inhibitor.

7. The rubber composition of claim 1 being a natural rubber.

8. The rubber composition of claim 1 being a styrene-butadiene rubber.

9. The rubber composition of claim 1 being Buna S.

10. The rubber composition of claim 1 being a butyl rubber.

* * * * *